(12) United States Patent
Wingfield et al.

(10) Patent No.: US 8,127,304 B2
(45) Date of Patent: Feb. 28, 2012

(54) MAPPING AND COMMUNICATING DATA FROM A USER INTERFACE TO AN APPLICATION PROGRAM

(75) Inventors: Steven Christopher Wingfield, Broomfield, CO (US); Randall Keith Pruett, Aurora, CO (US); Marc Hall Hoffsommer, Westminster, CO (US)

(73) Assignee: Rocket Software, Inc., Newton, MA (US)

( * ) Notice: Subject to any disclaimer, the term of this patent is extended or adjusted under 35 U.S.C. 154(b) by 998 days.

(21) Appl. No.: 11/421,419

(22) Filed: May 31, 2006

(65) Prior Publication Data

US 2007/0282851 A1   Dec. 6, 2007

(51) Int. Cl.
  *G06F 3/00* (2006.01)
(52) U.S. Cl. ...................................................... 719/313
(58) Field of Classification Search .................. 719/311, 719/313, 317, 320, 328, 330; 709/217–219; 715/234, 760
See application file for complete search history.

(56) References Cited

U.S. PATENT DOCUMENTS 5,961,601 A * 10/1999 Iyengar .......................... 709/229
(Continued)

OTHER PUBLICATIONS

M. Fowler, "Web Services Done Right Done Quickly", New Technology/enterprise Ltdm [online] www.iternum.com/knowhow/events/webservices/WebServices_Right_Quickly.ppt.

(Continued)

*Primary Examiner* — H. S. Sough
*Assistant Examiner* — Carina Yun
(74) *Attorney, Agent, or Firm* — David W. Victor; Konrad Raynes & Victor LLP (57) ABSTRACT

Provided are a method, program, and article of manufacture for mapping and communicating data from a user interface to an application program. Data is received from a user interface via a network protocol directed to an application program. State information is generated for a user of the user interface to use to invoke the application program. The received data is mapped to application variables. The application program uses the state information for the user and the application variables including the mapped data.

21 Claims, 5 Drawing Sheets

U.S. PATENT DOCUMENTS

| | | | |
|---|---|---|---|
| 6,212,673 | B1 | 4/2001 | House et al. |
| 6,343,332 | B1 | 1/2002 | Ueda |
| 6,553,360 | B1 | 4/2003 | Hockstra |
| 6,697,849 | B1 * | 2/2004 | Carlson .................. 709/219 |
| 7,558,861 | B1 * | 7/2009 | Qidwai et al. ............ 709/227 |
| 2002/0016814 | A1 * | 2/2002 | Convent et al. .......... 709/203 |
| 2002/0035593 | A1 | 3/2002 | Salim et al. |
| 2002/0095396 | A1 | 7/2002 | Frerking et al. |
| 2002/0161802 | A1 | 10/2002 | Gabrick et al. |
| 2002/0184610 | A1 | 12/2002 | Chong et al. |
| 2003/0050969 | A1 * | 3/2003 | Sant et al. ............... 709/203 |
| 2003/0069906 | A1 * | 4/2003 | Cichowlas et al. ....... 707/501.1 |
| 2004/0064570 | A1 | 4/2004 | Tock |
| 2004/0205695 | A1 | 10/2004 | Fletcher |
| 2004/0210907 | A1 * | 10/2004 | Lau et al. ................ 719/310 |
| 2005/0027752 | A1 | 2/2005 | Gelbard |
| 2005/0065937 | A1 | 3/2005 | Degenaro et al. |
| 2005/0144226 | A1 | 6/2005 | Purewal |

OTHER PUBLICATIONS

G.R. Voth, "Distributed Application Development for Three-Tier Architectures: Microsoft on Windows DNA", IEEE Internet Computing Mar. Apr. 1998, http://computer.org/internet/.

R. Baldoni et al., "Software Replication in Three-Tiers Architectures: Is it a Real Challenge?", The Computer Society, Proceedings of the Eight IEEE Workshop on Future Trends of Distributed Computing Systems, 2001.

J. Pecar-Ilie et al., "Dynamic and XML-Based River Navigation Maps for the Web", 7th International Conference on Telecommunications, Jun. 2003.

T. Watkin, et al., "SB+ Server a 4GL Tool Set for Rapid Application Development and Guitization", Ardent Software, Inc., Documentation DSB-5002, Release 5, 2000.

* cited by examiner

User Session Information

FIG. 3

Data Mapping Information

MAPPING AND COMMUNICATING DATA FROM A USER INTERFACE TO AN APPLICATION PROGRAM

BACKGROUND OF THE INVENTION

1. Field of the Invention

The present invention relates to a method, system, and program for mapping and communicating data from a user interface to an application program.

2. Description of the Related Art

Many applications that operate in a network environment are constructed as two-tier client-server applications, characterized by a constant connection from the client to the application. The front end to such applications operating in the client-server environment may be written using a fourth generation programming language ("4GL"), which is commonly used for basic user interfaces for clients accessing business applications in a client-server environment. Such basic user interfaces written using the 4GL language contain variables that are understood directly by the application.

In the current art, many users are accustomed to using the ubiquitous web browser user interface that communicates with a web server using a stateless network protocol, such as the Hypertext Transport Protocol (HTTP). However, such web browser interfaces are not compatible with the framework of an application program operating according to the client-server paradigm.

Thus, there is a need in the art for improved techniques to provide a user interface to application programs.

SUMMARY

Provided are a method, program, and article of manufacture for mapping and communicating data from a user interface to an application program. Data is received from a user interface via a network protocol directed to an application program. State information is generated for a user of the user interface to use to invoke the application program. The received data is mapped to application variables. The application program uses the state information for the user and the application variables including the mapped data.

DETAILED DESCRIPTION

Figure 1:
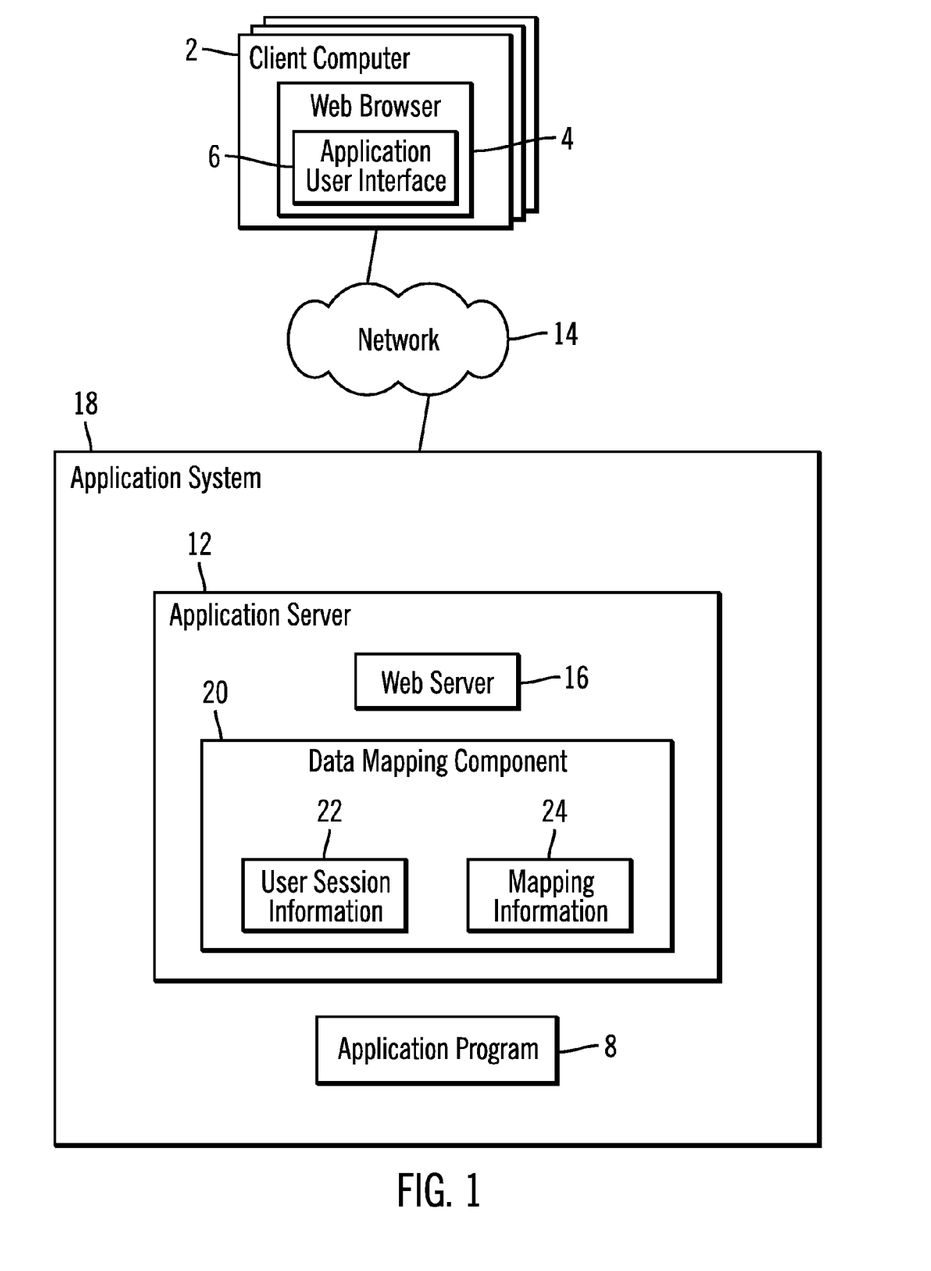
FIG. 1 illustrates an embodiment of a network computing environment.

FIG. 1 illustrates a network computing environment in which embodiments are implemented. Computers 2 include a web browser 4 implementing an application user interface 6 to provide data input to an application program 8 executing in an application runtime environment on an application system 10. The web browsers 4 communicate data in data fields in the application user interface 6 to an application program 8 over a network 14. The application server 12 includes a web server 16 enabling communication with the web browser 4. In one embodiment, both the program 8 and application server 12 are implemented in an application system 18. The application server 12 may communicate with the application program 8 by hosting the application program 8, or a subset of the application program, within the application server itself 12, and making direct calls to the methods and functions of the application program 12 or directly accessing the variables and data of the application program. In another embodiment, the application server 12 and application program 8 execute separately within the application system 18 and communicate via a suitable IPC mechanism known in the art.

In an alternative embodiment, the application server 12 and application program 8 may operate on separate boxes or systems and communicate over a network using a suitable remote inter-process communication protocol known in the art, such as network-based remote procedure calls (RPCs) or a client-server network communication technique. In certain embodiments, the application server 12 and application program 8 may run in separate runtime environments, where each runtime environment comprises a separate operating system process that does not share resources with other processes. In an alternative embodiment, the application server 12 and application program 8 may run in threads in the same process.

In one embodiment, the web browser 4 communicates with the application program 8 using a stateless network protocol, e.g., HTTP, where state information on a continued connection is not maintained. In such embodiments, the web browser 4 may comprise a Hypertext Markup Language (HTML) browser. Further, the application sever 12 may invoke the application program 8 in a stateful manner, where context and state information for a session is maintained in order to communicate with the application program 8.

The network 14 may comprise a suitable network, such as a Local Area Network (LAN), Storage Area Network (SAN), Wide Area Network (WAN), wireless network, peer-to-peer network, the Internet, an Intranet, etc.

The application server 12 includes a data mapping component 20. The data mapping component 20 includes session information 22 providing session information for web browsers 4 that have connected to the application program 8 through the application server 12 and mapping information 24 associating data fields from the application user interface 6 such as user enterable data fields, derived data fields whose values are calculated or otherwise derived from within the application program 8, and any other fields supporting the application program 8, with the application variables used by the application program 8. The application user interface 6 enables the user of the web browsers 4 to input data into fields for transfer as variables to the application program 8. The application program 8 uses these variables within executing operations. For instance, if the application program 8 comprises a database program, then the fields in the application user interface 6 may provide input into variables used by the application program 8 to perform certain transformations or conversions on database data. In such embodiments, the application program 8 provides functions, procedures, transforms, etc., that may be invoked to perform operations on database data. The application program 8 may then update the database with data resulting from the functions and procedures executed by the application program 8 that used the variables having data mapped from the application user interface 6 fields. The application server 12 may utilize or call into services, methods, functions, or other mechanisms from the application program 8 to perform this data transformation. Alternatively, the application program 8 may process database data with functions invoked from processes or threads that are separate from and independent of the application server 12.

Figure 2:
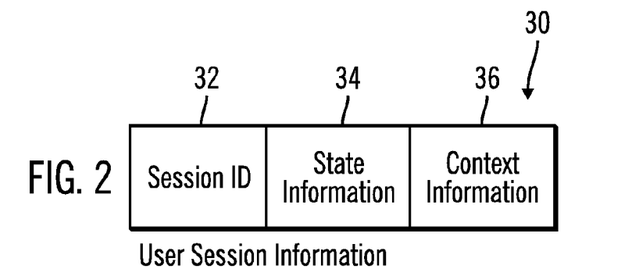
FIG. 2 illustrates an embodiment of user session information.

FIG. 2 illustrates an embodiment of the user session information 30 for one user web browser 4 that is providing data to the application program 8, including a session identifier 32, state information 34 used to identify the user of the web browser 4 to the application program 8, and context information 36 comprising recent settings for variables and other settings set during communications with the application program 8. The context information 36 represents a current state of the connection with the application program 8 for a particular session. The context information 36 provides information to enable a stateful session between a user at a web browser 4 and the application program 8. Further, the context information 36 allows new web browser 4 requests to access the application program 8 constructs in the same "context" as the previous web request from the same user in order to provide an appearance of a constant connection to the application program 8.

Figure 3:
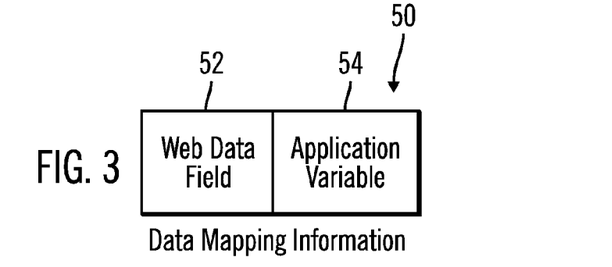
FIG. 3 illustrates an embodiment of data mapping information.

FIG. 3 illustrates an embodiment of data mapping information 50 for one data field in the user interface 6, including a web data field 52 in the application user interface 6 in which the user may enter data to input to the application program 8 and a corresponding application variable 54. The application server 12 may call into the methods, functions, or other services of the application program 8 to format or otherwise transform, or to validate data from the web data field 52 when including in the corresponding application variable 54 to send to the application program 8. The application server 12 may also format or otherwise transform, or validate data from the web data field 52 using mechanisms outside the application program 8.

In one embodiment, the data mapping component 20 may run in the same operating environment as the application program 8. When a user provides data through the web browser 4, the application server 12 may communicate the data to the data mapping component 20 to call services of the application program 8 to transform or validate the data and to map the data to application variables to provide to the application program 8. In one embodiment, the application server 12 may communicate data from the web browser 4 received at the web server 16 to the data mapping component 20 by using an inter-process communication protocol, such as inter-process communication (IPC) pipes, Remote Procedure Calls (RPC), etc. Further, the application server 12 (or other component therein) may load the state 34 and context 36 information for the user or session providing the data via the web browser 4 for the data mapping component 20 to use when mapping the variables and calling functions and services of the application program 8.

Figure 4:
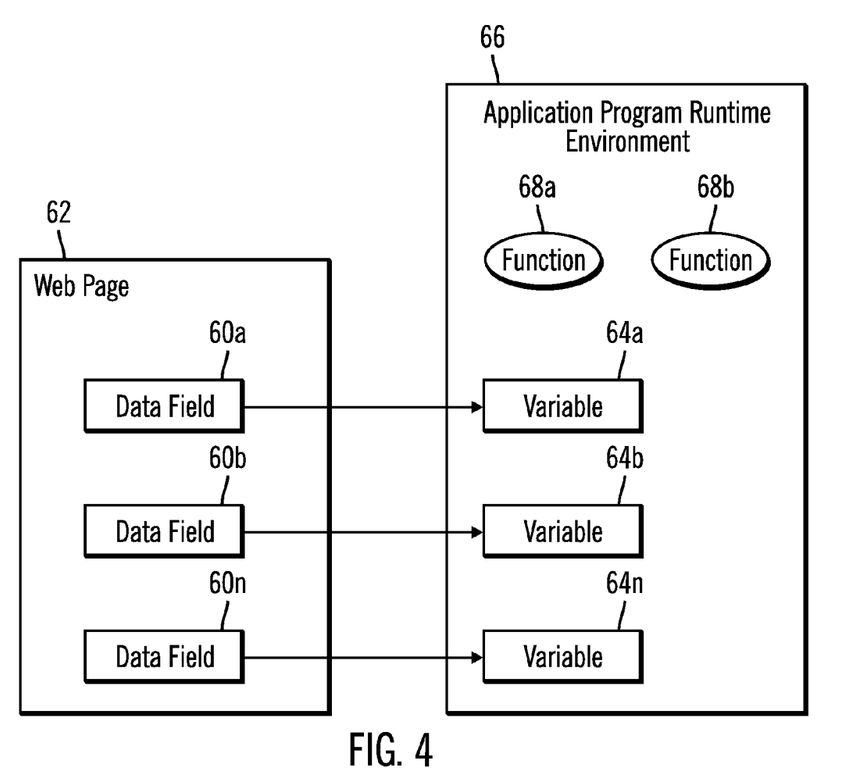
FIG. 4 illustrates an embodiment of a mapping of data fields in a web page to variables used by an application program.

FIG. 4 illustrates how data fields 60a, 60b . . . 60n in a web page 62, implementing the application user interface 6 and communicated by the web browser 4 to the web server 16, map to variables 64a, 64b . . . 64n in the application program execution or runtime environment 66. The application program runtime environment 66 comprises the process in which the application program 8 functions 68a, 68b subroutines and methods are executed. Functions 68a and 68b of the application program 8, which may execute as threads within the application program runtime environment 66, may utilize the variables 64a, 64b . . . 64n comprising data from the web page 62. The data fields 60a, 60b . . . 60n and corresponding variables 64a, 64b . . . 64n are indicated in the web data field 52 (FIG. 3) and application variable field 54 in separate instances of the data mapping information 50. The data mapping component 20 may also run in the application program runtime environment 66. The data component 20, of the application server 12, running in the application program runtime environment 66, may use native calls and facilities of the application program 8 to invoke the application program functions 68a, 68b.

Additionally, the functions 68a, 68b using the mapped variables 64a, 64b . . . 64n may be invoked by processes or threads other than those of the application server 12.

For instance, the application program runtime environment 66 may comprise code from an application framework, such as the Basic computer language, International Business Machine's ("IBM") SystemBuilder™ Paragraph language, etc. (IBM is a registered trademark and SystemBuilder is a trademark of IBM).

Figure 5:
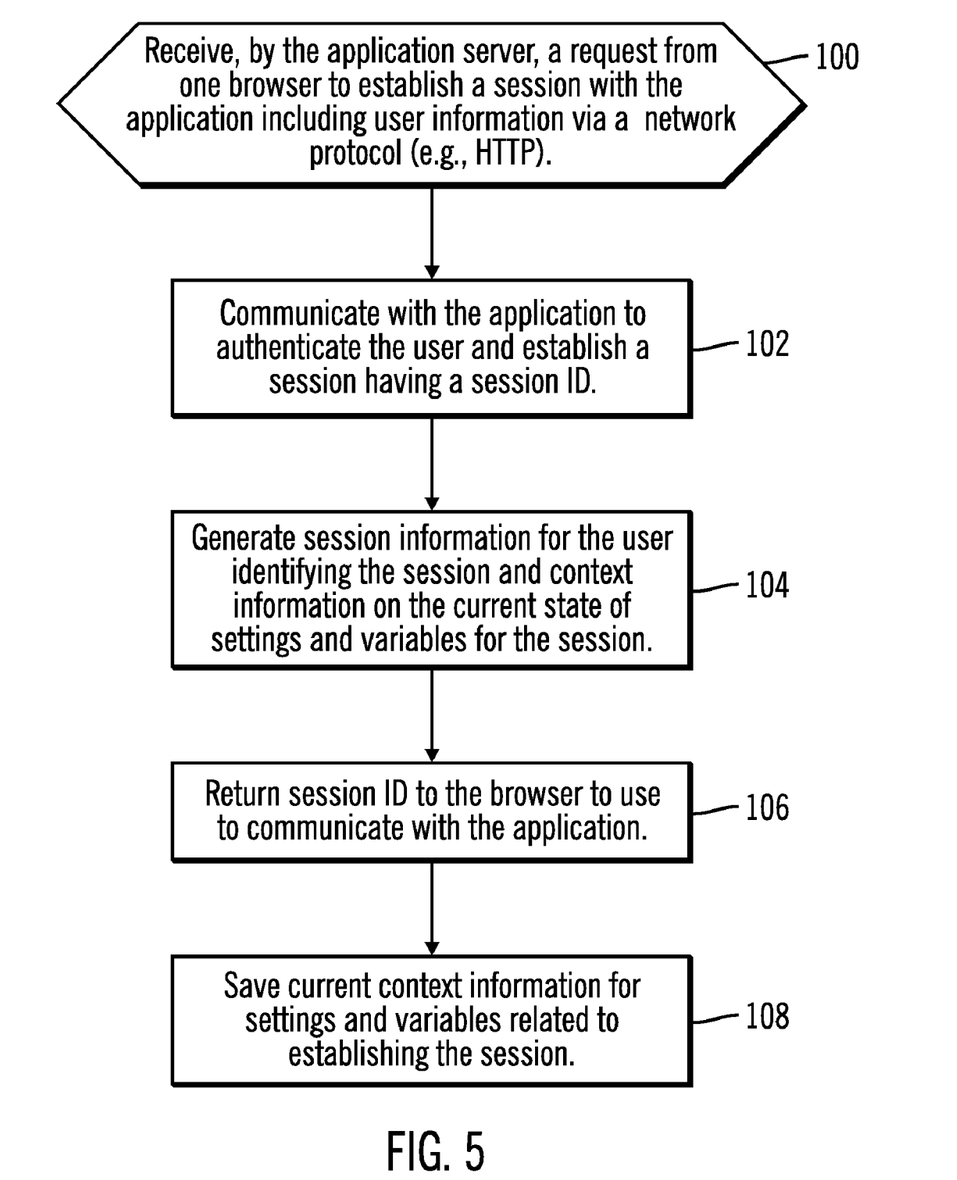
FIG. 5 illustrates an embodiment of operations to establish a session for a web browser user interface.

FIG. 5 illustrates an embodiment of operations performed by the application server 12 to establish a session between a web browser 4 and the application program 8. Upon receiving (at block 100) a request from one browser 4 to establish a session with the application program 8, the application server 12 communicates (at block 102) with the application program 8 to authenticate the user of the web browser 4 and establish a session having a session ID. Session information 30 is generated (at block 104) for the user identifying the session 32, state information 34 having connection identification information, e.g., to identify and authenticate the user of the web browser 4, and context information 36 on the current state of settings and variables for the session. In one embodiment, the application server 12 returns (at block 106) the session ID 32 to the browser 4 to use in subsequent communications to the application server 12 to allow the application server 12 to identify the session information 50 for that request. In an alternative embodiment, the web browser 4 may provide other types of information, such as a user identifier or other session identifiers, to enable the application server 12 to determine the session to use for the requesting web browser 4. After establishing a session, the application server 12 saves (at block 108) the current context information 36 for settings and variables related to establishing the session, which indicate the current state of the connection between the web browser 4 and application program 8.

With the operations of FIG. 5, the application server 12 establishes a connection with the application program 8. As discussed, the application server 12 may use inter-process communication techniques or other stateful communication protocols on behalf of the web browser 4 which communicates to the application server 12 using a different network protocol, such as a stateless protocol.

Figure 6:
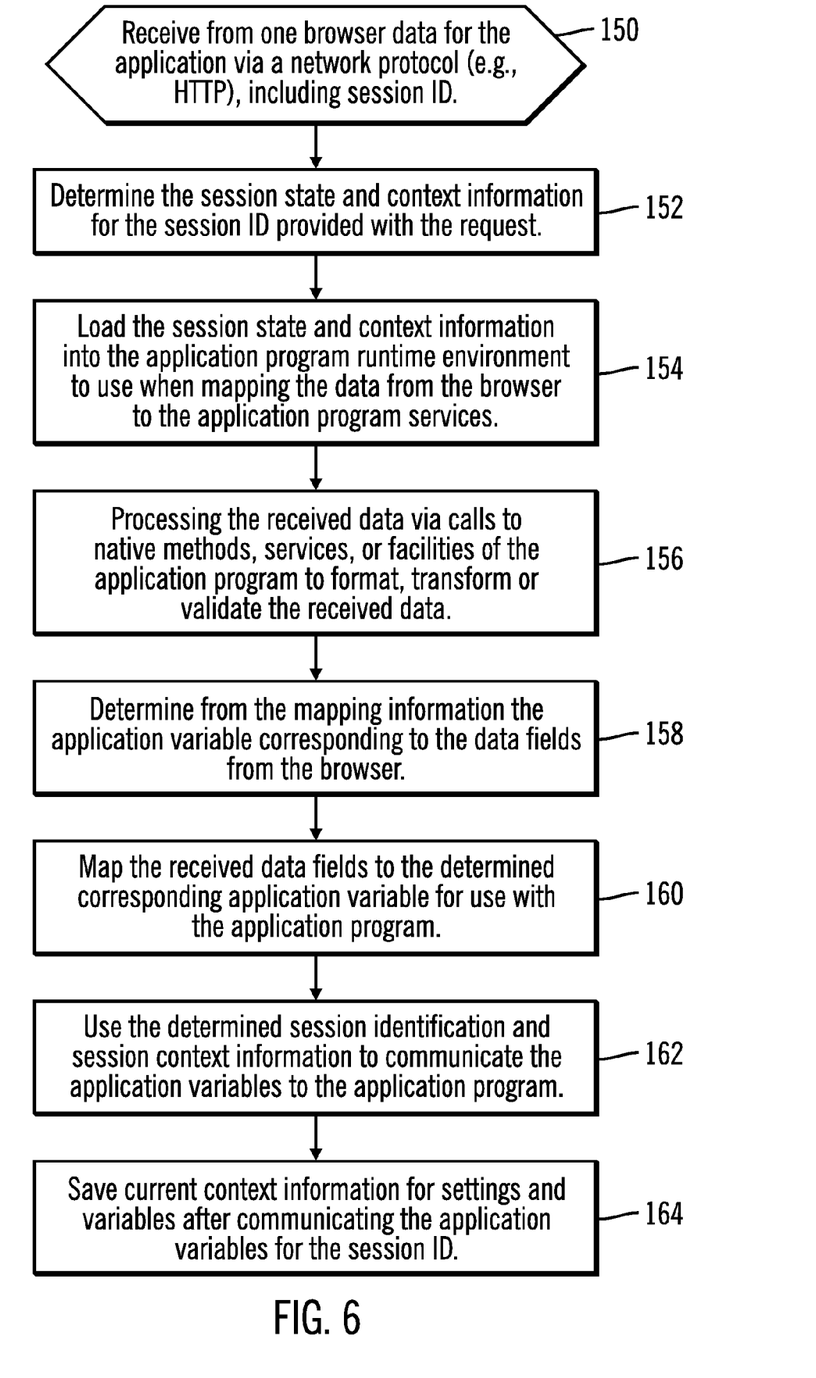
FIG. 6 illustrates an embodiment of operations to communicate data from a web browser to an application program.

FIG. 6 illustrates an embodiment of operations implemented by the data mapping component 20 or other components of the application server 12 to provide data entered by the user in the application user interface 6 in the web browser 4 to the application program 8. Upon receiving (at block 150) from one browser 4 data for the application program 8 via a stateless network protocol (e.g., HTTP), including a session ID, the application server 12 determines (at block 152) the session state 34 and context information 36 for the session ID 32 provided with the request. The determined session state 34 and context information 36 is loaded (at block 154) into the application program runtime environment 66 to use when mapping the data from the web page 62 to the application program 8 services. The data mapping component 20 may further process (at block 156) the received data via calls to native methods, services, or facilities of the application program to format, transform or validate the received data. The data mapping component 20 determines (at block 158) from the data mapping information 50 the application variable 54 corresponding to the data variable from the browser 4. The received data field 60$a$, 60$b$ ... 60$n$ from the web page 62 is mapped (at block 160) to the determined corresponding application variable 62$a$, 62$b$ ... 62$n$ for use by application program functions 68$a$, 68$b$ in the application program runtime environment 66. The data mapping component 20 maps each data field 60$a$, 60$b$ ... 60$n$ from the web page 62 to the corresponding application variable 62$a$, 62$b$ ... 62$n$ using the mapping information. One or more of the data fields may or may not be transformed, converted or validated by calls to the application program 8 services before being mapped to application variables 64$a$, 64$b$ ... 64$n$.

The data mapping component 20 uses (at block 162) the determined session state 34 and context information 36 to communicate the application variables 64$a$, 64$b$ ... 64$n$ to the application program 8. After completing the operation, the data mapping component 20 saves (at block 164) the current context information 36 for settings and variables so that the context information 36 represents the state of the application program 8 for that user after the transfer of the input data is complete. A subsequent request from another user may cause that user's context and state information to be loaded into the application program runtime environment 66 to provide a stateful environment for that user communicating or requesting data with respect to the application program 8.

Further, the web browser 4 may request data. In response, the data mapping component 20 may translate the request to a request for the corresponding application variables, as indicated in the mapping information 24, from the application program 8. Upon receiving the requested data from the application program 8 in response to the request, the application server 12 may map the application variables to the corresponding web data fields in a web page or form to return to the web browser 4 using the stateless network protocol. Prior to mapping the application variables to the corresponding web data fields, the application server 12 may format or otherwise transform the data in the application variables by invoking native methods or services of the application program 8. For instance, if the application program 8 is implemented using the IBM SystemBuilder paragraph language, then the data mapping component 20, operating in the application program runtime environment 66, and calling into the application program 8, e.g., SystemBuilder environment may invoke native SystemBuilder Paragraphs, Expressions, etc. during the processing of the request from the web browser 4

Described embodiments provide techniques to allow an application designed to receive input data and variables in a stateful environment, to interface with a user interface designed for another type of environment, such as the web browser. Described embodiments maintain for each web browser communicating with the application program a session identifier that is used to reference and reinstate all application program specific stored context information with each web request from the web browser. Further, with the described embodiments, data maintained in web form data fields is mapped to application variables that may be directly accessed and used by application program functions executing in the application program runtime environment. Further, with the described embodiments, data maintained in web form data fields may be formatted or otherwise transformed, or validated, via calls from application server components, such as the data mapping component, into native methods, services or other facilities of the application program.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

Figure 7:
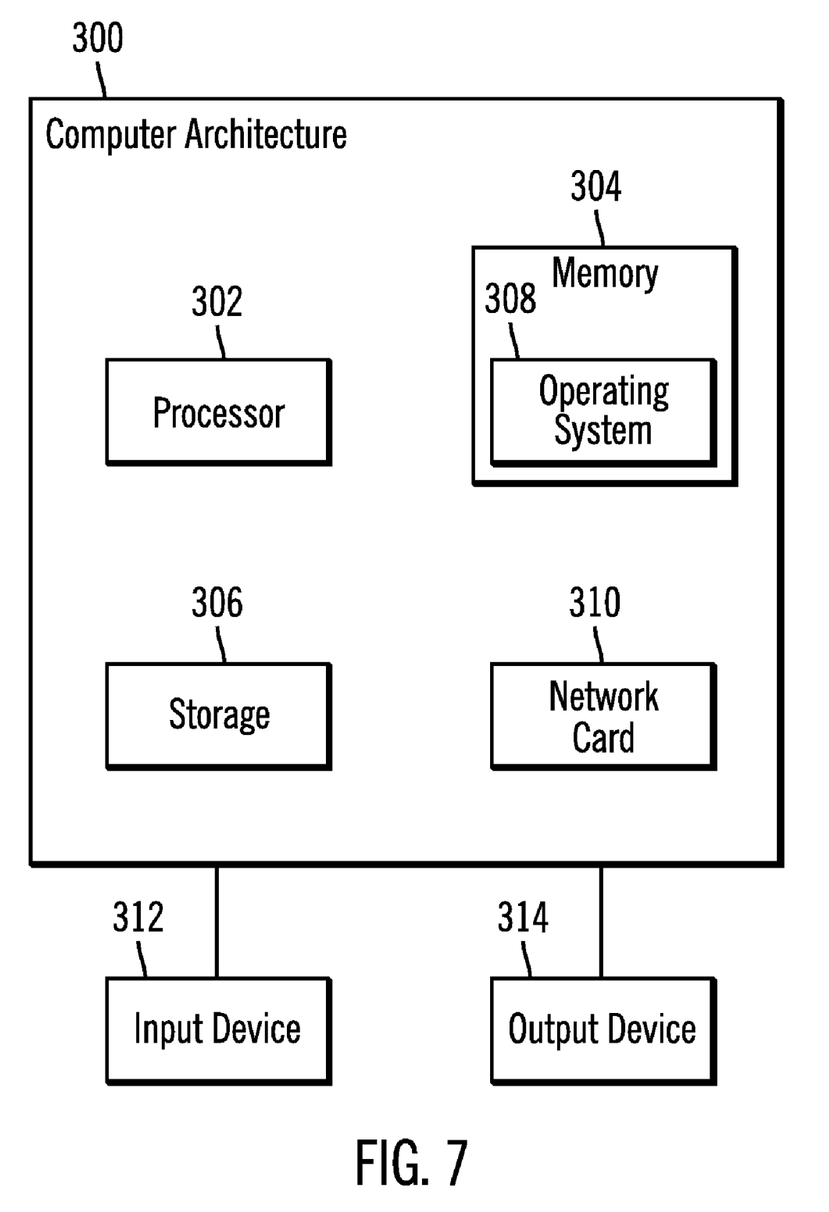
FIG. 7 illustrates an embodiment of a computer architecture.

FIG. 7 illustrates an embodiment of a computer architecture 300 that may be implemented by the client computer 2, the application system 18 or other systems including the application server 12 and application program 8. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs, including an operating system 308 and application programs, in the storage 306 are loaded into the memory 304 and executed by the processor 302 in a manner known in the art. The architecture further includes a network card 310 to enable communication with a network. An input device 312 is used to provide user input to the processor 302, and may include a keyboard, mouse, pen-stylus, microphone, touch sensitive display screen, or any other activation or input mechanism known in the art. An output device 314 is capable of rendering information transmitted from the processor 302, or other component, such as a display monitor, printer, storage, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices, components, applications and services that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device, component or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5 and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

maintaining, by an application server, session information for sessions initiated by user interfaces at client computers to access functions and operations of an application program, wherein the session information for the sessions comprises session identifiers provided to the user interfaces at the client computers to use to access the application program and context information comprising recent settings and variables resulting from at least one interaction between the client computers and the application program occurring during the sessions;

receiving a first request from a requesting user interface comprising one of the user interfaces in one of the client computers via a network protocol directed to the application program, wherein the network protocol comprises a stateless network protocol;

generating an additional session identifier to identify an additional session initiated by the requesting user interface for the application program providing the first request;

generating additional state information and additional context information for the additional session to use to invoke the application program, wherein the additional state information is used to identify a user of the requesting user interface to the application program and wherein the additional context information provides information to enable a stateful session between the requesting user interface initiating the additional session and the application program;

saving the additional state information and the additional context information as saved state information and saved context information in an instance of session information for the additional session initiated in response to the first request, wherein the saved context information indicates a state of settings and variables used by the application program to process the first request of the additional session;

in response to a second request including received data from the requesting user interface at one of the client computers, including the additional session identifier created during the first request, loading the saved context information for the settings and variables for the additional session identified by the additional session identifier into an application program runtime environment to reinstate the saved context information, including application program specific settings and variables resulting from the processing of the first request, to allow the requesting user interface making the second request to access the application program in a same context as the first request via the stateless network protocol;

mapping the received data in the second request to application variables;

using the saved state information and the saved context information loaded in response to the second request to communicate the application variables to the application program;

using, by the application program, the saved state information and the saved context information for the additional session loaded in response to the second request; and saving the context information for settings and variables used by the application program to process the second request including the received data.

2. The method of claim 1, further comprising:
processing the received data using functions of the application program, wherein the processed received data is mapped to the application variables.

3. The method of claim 2, wherein processing, by the data mapping component, the received data comprises at least one of formatting, transforming converting or validating the received data using at least one function of the application program.

4. The method of claim 1, wherein the requesting user interface comprises a web form having fields in which the received data is entered, wherein a mapping associates fields in the web form to application program variables, wherein the mapping is used to map the received data in the web form to the corresponding application program variable.

5. The method of claim 1, further comprising:
receiving a third request for data fields from the requesting user interface via the network protocol;
determining application variables corresponding to the requested data fields;
submitting a fourth request to the application program for the application variables using an inter-process communication protocol;
mapping the data for the application variables received in response to the fourth request to the corresponding data fields to include in a page; and
returning the page to the requesting user interface using the network protocol.

6. The method of claim 1, wherein the application program comprises a database program, wherein the received data comprises variables used by the database program to perform transformations on database data, and wherein the database program updates the database with data resulting from the transformations.

7. The method of claim 1, wherein a server, including the application program and the application server, receives the data from the requesting user interface at the client over a network via the network protocol, wherein the application server performs the operations of generating the additional session identifier, generating the additional state information and the additional context information, saving the additional state information and the additional context information, loading the saved context information for session into the application program runtime environment in the server.

8. A system in communication with user interfaces executing in client computers over a network, comprising:
a computer readable storage medium including:
an application program;
an application server configured to perform operations comprising:
maintaining session information for sessions initiated by the user interfaces at the client computers to access functions and operations of the application program, wherein the session information for the sessions comprises session identifiers provided to the user interfaces at the client computers to use to access the application program and context information comprising recent settings and variables resulting from at least one interaction between the client computers and the application program occurring during the sessions;
receiving a first request from a requesting user interface comprising one of the user interfaces in one of the client computers via a network protocol directed to the application program, wherein the network protocol comprises a stateless network protocol;
generating an additional session identifier to identify an additional session initiated by the requesting user interface for the application program providing the first request;
generating additional state information and additional context information for the additional session to use to invoke the application program, wherein the additional state information is used to identify a user of the requesting user interface to the application program and wherein the additional context information provides information to enable a stateful session between the requesting user interface initiating the session and the application program;
saving the additional state information and the additional context information as saved state information and saved context information in an instance of session information for the additional session initiated in response to the first request, wherein the saved context information indicates a state of settings and variables used by the application program to process the first request of the additional session;
in response to a second request including received data from the requesting user interface at one of the client computers, including the additional session identifier created during the first request, loading the saved context information for the settings and variables for the additional session identified by the additional session identifier into an application program runtime environment to reinstate the saved current context information, including application program specific settings and variables resulting from the processing of the first request to allow the requesting user interface making the second request to access the application program in a same context as the first request via the stateless network protocol;
mapping the received data in the second request to application variables;
using the saved state information and the saved context information loaded in response to the second request to communicate the application variables to the application program;
using, by the application program, the saved state information and the saved context information for the additional session loaded in response to the second request; and
saving the context information for settings and variables used by the application program to process the second request including the received data.

9. The system of claim 8, wherein the application server further performs:
processing the received data using functions of the application program, wherein the processed received data is mapped to the application variables.

10. The system of claim 9, wherein processing, by the application server, the received data comprises at least one of formatting, transforming converting or validating the received data using at least one function of the application program.

11. The system of claim 8, wherein the requesting user interface comprises a web form having fields in which the received data is entered, wherein a mapping associates fields in the web form to application program variables, wherein the data mapping component uses the mapping to map the received data in the web form to the corresponding application program variable.

12. The system of claim 8, wherein the application server further performs:
- receiving a third request for data fields from the requesting user interface via the network protocol;
- determining application variables corresponding to the requested data fields;
- submitting a fourth request to the application program for the application variables using an inter-process communication protocol;
- mapping the data for the application variables received in response to the fourth request to the corresponding data fields to include in a page; and
- returning the page to the requesting user interface using the network protocol.

13. The system of claim 8, wherein the application program comprises a database program, wherein the received data comprises variables used by the database program to perform transformations on database data, and wherein the database program updates the database with data resulting from the transformations.

14. The system of claim 8, wherein the system comprises a server, including the application program and the application server, that receives the data from the requesting user interface at the client over a network via the network protocol, wherein the application server performs the operations of generating the additional session identifier, generating the additional state information and the additional context information, saving the additional state information and the additional context information, loading the saved context information for the session into the application program runtime environment in the server.

15. An article of manufacture comprising a computer readable storage medium including application server code executed to communicate with user interfaces in client computers over a network and an application program, and to further perform operations, the operations comprising:
- maintaining session information for sessions initiated by the user interfaces at the client computers to access functions and operations of an application program, wherein the session information for the sessions comprises session identifies provided to the user interfaces at the client computers to use to access the application program and context information comprising recent settings and variables resulting from at least one interaction between the client computers and the application program occurring during the sessions;
- receiving a first request from a requesting user interface comprising one of the user interfaces in one of the client computers via a network protocol directed to the application program, wherein the network protocol comprises a stateless network protocol;
- generating an additional session identifier to identify an additional session initiated by the requesting user interface for the application program providing the first request;
- generating additional state information and additional context information for the additional session to use to invoke the application program, wherein the additional state information is used to identify a user of the requesting user interface to the application program and wherein the additional context information provides information to enable a stateful session between the requesting user interface initiating the additional session and the application program;
- saving the additional state information and the additional context information as saved state information and saved context information in an instance of session information for the additional session initiated in response to the first request, wherein the saved context information indicates a state of settings and variables used by the application program to process the first request of the additional session;
- in response to a second request including received data from the requesting user interface at one of the client computers, including the additional session identifier created during the first request, loading the saved context information for the settings and variables for the additional session identified by the additional session identifier into an application program runtime environment to reinstate the saved context information, including application program specific settings and variables resulting from the processing of the first request to allow the requesting user interface making the second request to access the application program in a same context as the first request via the stateless network protocol;
- mapping the received data in the second request to application variables;
- using the saved state information and the saved context information loaded in response to the second request to communicate the application variables to the application program;
- using, by the application program, the saved state information and the saved context information for the additional session loaded in response to the second request; and
- saving the context information for settings and variables used by the application program to process the second request including the received data.

16. The article of manufacture of claim 15, wherein the operations further comprise:
- processing the received data using functions of the application program, wherein the processed received data is mapped to the application variables.

17. The article of manufacture of claim 16, wherein processing the received data comprises at least one of formatting, transforming, converting or validating the received data using at least one function of the application program.

18. The article of manufacture of claim 15, wherein the requesting user interface comprises a web form having fields in which the received data is entered, wherein a mapping associates fields in the web form to application program variables, wherein the mapping is used to map the received data in the web form to the corresponding application program variable.

19. The article of manufacture of claim 15, wherein the operations further comprise:
- receiving a third request for data fields from the requesting user interface via the network protocol;
- determining application variables corresponding to the requested data fields;
- submitting a fourth request to the application program for the application variables using an inter-process communication protocol;
- mapping the data for the application variables received in response to the fourth request to the corresponding data fields to include in a page; and
- returning the page to the requesting user interface using the network protocol.

20. The article of manufacture of claim 15, wherein the application program comprises a database program, wherein the received data comprises variables used by the database program to perform transformations on database data, and wherein the database program updates the database with data resulting from the transformations.

21. The method of claim 15, wherein a server, including the application program and the application server receives the data from the requesting user interface at the client over a network via the network protocol, wherein the server executes the application server code for performing the operations of generating the additional session identifier, generating the additional state information and the additional context information, saving the additional state information and the additional context information, loading the saved context information for the session into the application program runtime environment in the server.

* * * * *